(12) United States Patent
Matsumoto

(10) Patent No.: US 8,657,458 B2
(45) Date of Patent: Feb. 25, 2014

(54) LIGHTING DEVICE, DISPLAY DEVICE AND TELEVISION RECEIVER

(75) Inventor: Shinji Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 117 days.

(21) Appl. No.: 13/505,752

(22) PCT Filed: Oct. 21, 2010

(86) PCT No.: PCT/JP2010/068583
§ 371 (c)(1),
(2), (4) Date: May 3, 2012

(87) PCT Pub. No.: WO2011/062023
PCT Pub. Date: May 26, 2011

(65) Prior Publication Data
US 2012/0218475 A1   Aug. 30, 2012

(30) Foreign Application Priority Data
Nov. 19, 2009   (JP) ................................ 2009-264165

(51) Int. Cl.
*G09F 13/04*   (2006.01)

(52) U.S. Cl.
USPC ............. 362/97.1; 362/632; 362/346; 349/61

(58) Field of Classification Search
USPC ........... 362/97.1, 632, 341, 346, 97.2; 349/61
See application file for complete search history.

(56) References Cited

U.S. PATENT DOCUMENTS

| 6,316,778 | B1 * | 11/2001 | Goodman et al. | 250/551 |
| 2005/0024845 | A1 | 2/2005 | Mori et al. | |
| 2006/0109643 | A1 | 5/2006 | Chang | |
| 2007/0019275 | A1 * | 1/2007 | Okuda | 359/265 |
| 2007/0064408 | A1 | 3/2007 | Shimizu et al. | |
| 2010/0321927 | A1 * | 12/2010 | Yoshikawa | 362/97.2 |
| 2011/0102686 | A1 * | 5/2011 | Hisada | 348/739 |

FOREIGN PATENT DOCUMENTS

| JP | 2005-050727 A | 2/2005 |
| JP | 2006-146126 A | 6/2006 |
| JP | 2007-048614 A | 2/2007 |
| JP | 2007-086195 A | 4/2007 |
| JP | 2009-076456 A | 4/2009 |

OTHER PUBLICATIONS

Official Communication issued in International Patent Application No. PCT/JP2010/068583, mailed on Dec. 21, 2010.

* cited by examiner

*Primary Examiner* — Ali Alavi
(74) *Attorney, Agent, or Firm* — Keating & Bennett, LLP

(57) ABSTRACT

A lighting device, uneven brightness of which is suppressed, is provided. A lighting device of the present invention includes LEDs 17, a chassis 14 that houses the LEDs 17 therein, and a chassis reflection sheet 22 that is provided on an inner surface of the chassis 14 and configured to reflect light from the LEDs 17. The LEDs 17 are provided on a bottom plate 14a of the chassis 14. The chassis reflection sheet 22 has a bottom portion 31 that extends along the bottom plate 14a and slanted portions 32 that extend from a periphery of the bottom portion 31. The slanted portions 32 slant to a direction in which the LED emits light with respect to the bottom portion. A boundary L between the bottom portion 31 and the slanted portions 32 is formed in a nonlinear shape in a plan view.

11 Claims, 10 Drawing Sheets

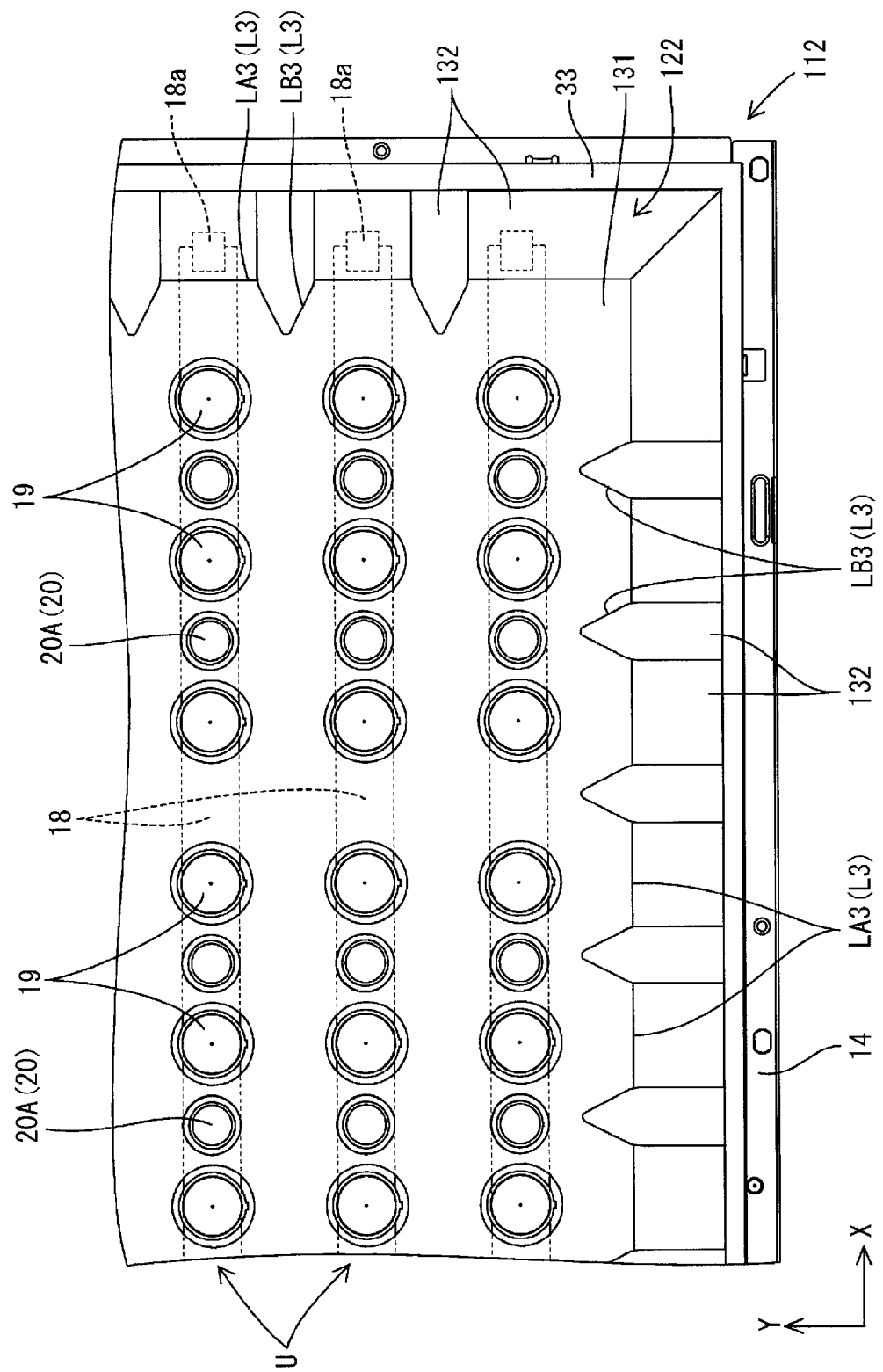

LIGHTING DEVICE, DISPLAY DEVICE AND TELEVISION RECEIVER

TECHNICAL FIELD

The present invention relates to a lighting device, a display device and a television receiver.

BACKGROUND ART

Conventionally, a liquid crystal panel used for a liquid crystal display device such as a liquid crystal television does not emit light, and thus a backlight unit is required as a separate lighting device. The backlight unit is known, which is arranged behind the liquid crystal panel (on aside opposite to a display surface side). The backlight unit includes a chassis having an opening on its surface side facing the liquid crystal panel, light sources (such as cold cathode tubes and LEDs) arranged on an inner surface of a bottom plate in the chassis, an optical member (such as a diffuser sheet) provided in the opening of the chassis for effectively directing light emitted from the light source toward the liquid crystal panel side and a reflection sheet arranged in the chassis for reflecting light from the light source toward the optical member and the liquid crystal panel side. A backlight unit disclosed in Patent Document 1 has been known.

Patent Document 1: Japanese Unexamined Patent Publication No. 2006-146126

Problem to be Solved by the Invention

A reflection sheet arranged in the backlight unit includes a bottom portion and a slanted portion. The bottom portion is provided along a bottom plate of a chassis. The slanted portion extends from a periphery of the bottom portion and slants toward a liquid crystal panel side with respect to the bottom portion. Specifically, as the slanted portion goes to the outer edge of the chassis, the slanted portion slants closely to the liquid crystal panel side. The slanted portion makes it possible to direct reflected light to an inner surface (the middle of the liquid display device).

In the backlight unit, a light source having high directivity (such as an LED) is arranged with a light axis thereof aligned with a direction from a bottom plate to a liquid crystal panel (namely, the light source arranged in an area corresponding to the bottom portion of the reflection sheet). In this case, an area of the reflection sheet around a boundary between the bottom portion and the slanted portion (around the periphery of the bottom portion or the basal end of the slanted portion) tends to be darker than other areas.

This situation may be caused by two reasons explained below. Firstly, the area around the boundary is the periphery edge of the bottom portion, and accordingly the distance from the light source is longer in comparison to the middle area of the bottom portion. Therefore, light from the light source is less likely to reach the area around the boundary in comparison to the middle area of the bottom portion. Secondly, if a light source has high directivity, the amount of emitted light decreases as the angle to the light axis increases. The light source and the area around the boundary (the basal end of the slanted portion) are arranged along the bottom plate. If the light axis of the light source is directed to the liquid crystal panel side, an angle of the slanted portion to the light axis is greater in the area around the boundary than at the top end of the slanted portion. With this configuration, light emitted from the light source is less likely to reach the area around the boundary compared to the top end of the slanted portion.

Due to the two reasons, the area around the boundary between the bottom portion and the slanted portion of the reflection sheet is a portion where the light emitted from the light source is least likely to reach. Therefore, the amount of light reflected to the liquid crystal panel side decreases. As a result, a portion along the boundary becomes darker than other portions in the backlight unit and this may cause uneven brightness.

DISCLOSURE OF THE PRESENT INVENTION

The present invention was accomplished in view of the above circumstances. It is an object of the present invention to provide a lighting device, uneven brightness of which is suppressed. Another object of the present invention is to provide a display device and a television receiver including the lighting device.

Means for Solving the Problem

To solve the above problem, a lighting device of the present invention includes at least one light source, a chassis housing the at least one light source therein and a reflection sheet provided on an inner surface of the chassis and configured to reflect light from the at least one light source. The at least one light source is provided at a bottom plate of the chassis. The reflection sheet includes a bottom portion that extends along the bottom plate and slanted portions that extend from a periphery of the bottom portion. The slanted portions slant toward a direction in which light from the at least one light sources emits with respect to the bottom portion. A boundary between the bottom portion and the slanted portions is formed in a nonlinear shape in a plan view.

In the present invention, the boundary between the bottom portion and the slanted portions is nonlinear in a plan view. In such a situation, a dark portion along the boundary is formed in a nonlinear shape in a plan view. If the dark portion is formed in a nonlinear shape, the boundary between the dark portion and surroundings thereof is less clear compared to a case where the dark portion is formed in a linear shape. Therefore, uneven brightness is less likely to be recognized. Here, "the dark portion is formed in a nonlinear shape" means that the boundary between the bottom portion and the slanted portions is not all linear. In other words, linear portions may be partially included in the boundary.

In the above configuration, the boundary between the bottom portion and the slanted portions may be formed in a square-wave shape in a plan view. The boundary in a square-wave shape is more easily formed than that in other nonlinear shapes (such as curves including a sinusoidal wave shape). If a curved boundary is formed, a surface of each slanted portion is required to be formed in a curved shape. This may cause uneven brightness. If the boundary is in the square-wave shape, the slanted portions can be formed with flat surfaces. Therefore, uneven brightness may not be caused by the reason explained above.

The slanted portions may be formed by partially folding the reflection sheet. With such a configuration, the bottom portion and the slanted portions are not required to be made from different members, and therefore, the number of parts decreases. Thus, the reflection sheet may be easily handled (installed, kept and the like).

The bottom portion and the slanted portions may be made from different members. This makes it possible to form the reflection sheet having a nonlinear boundary easily, compared to a case of forming the bottom portion and the slanted portions from a single member (for example, a case where the reflection sheet is folded to form the bottom portion and the slanted portions).

The bottom portion may be formed in an approximately rectangular shape with a plan view. The slanted portions may extend from the four sides of the bottom portion, respectively.

The at least one light source may be a light emitting diode. This achieves low power consumption.

A diffuser lens may be arranged so as to cover the at least one light source and configured to diffuse light from the at least one light source. With such a configuration, light emitted from the light sources is diffused through the diffuser lens. This causes arrangement intervals between the light sources to make longer (namely, the number of light sources decreases), and this makes the brightness uniform.

The at least one light source may further include a plurality of light sources arranged in rows and columns in the direction along the bottom plate of the chassis.

Next, to solve the above problem, a display device of the present invention may include the above lighting device and a display panel configured to provide display using light from the lighting device.

The display panel may be a liquid crystal panel. The display device as a liquid crystal display device has a variety of applications, such as a television display or a personal-computer display. Particularly, it is suitable for a large screen display.

Next, to solve the above problem, a television receiver of the present invention may include the display device.

Advantageous Effect of the Invention

According to the present invention, a lighting device, uneven brightness of which is suppressed, can be provided. Furthermore, a display device and a television receiver including the lighting device can be provided.

BRIEF DESCRIPTION OF THE DRAWINGS

FIG. 10 is an enlarged view in the vicinity of a peripheral portion of the chassis reflection sheet according to a second embodiment of the present invention.

BEST MODE FOR CARRYING OUT THE INVENTION

<First Embodiment>

A first embodiment of the present invention will be described with reference to FIGS. 1 to 9. In the present embodiment, a liquid crystal display device 10 will be explained. An X axis, a Y-axis and a Z-axis are described in a part of the drawings, and a direction of each axial direction corresponds to a direction described in each drawing. An upper side in FIGS. 4 and 5 corresponds to a front-surface side and a lower side in FIGS. 4 and 5 corresponds to a rear-surface side.

Figure 1:
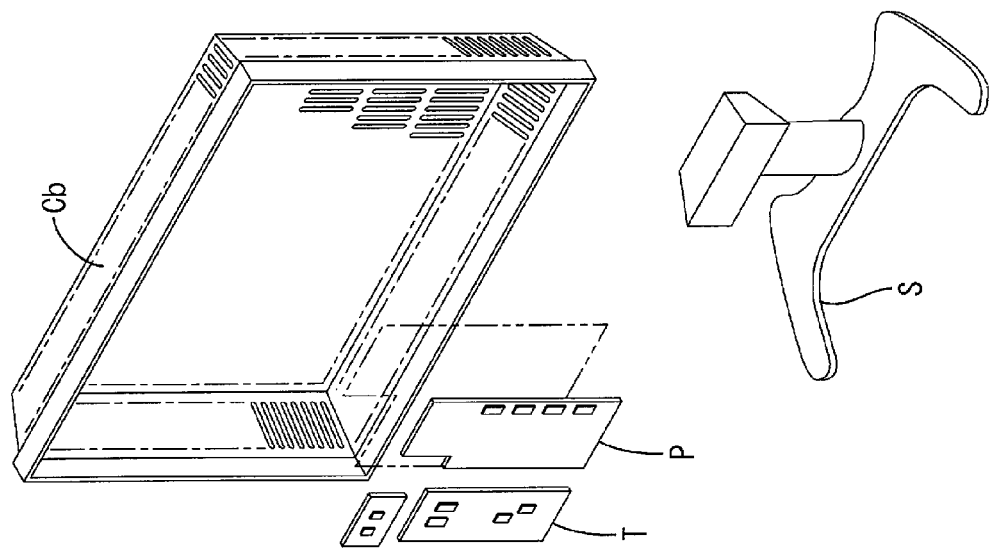
FIG. 1 is an exploded perspective view illustrating a general configuration of a television receiver according to a first embodiment of the present invention.
Figure 1:
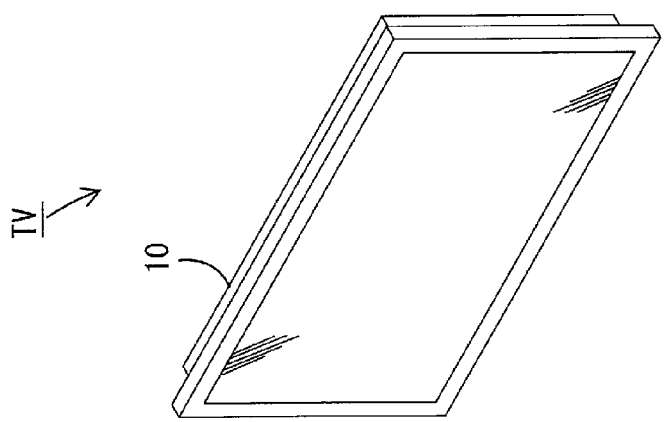
Figure 1:
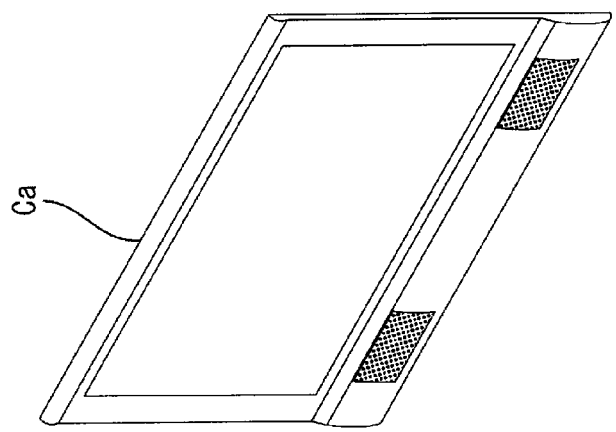
Figure 2:
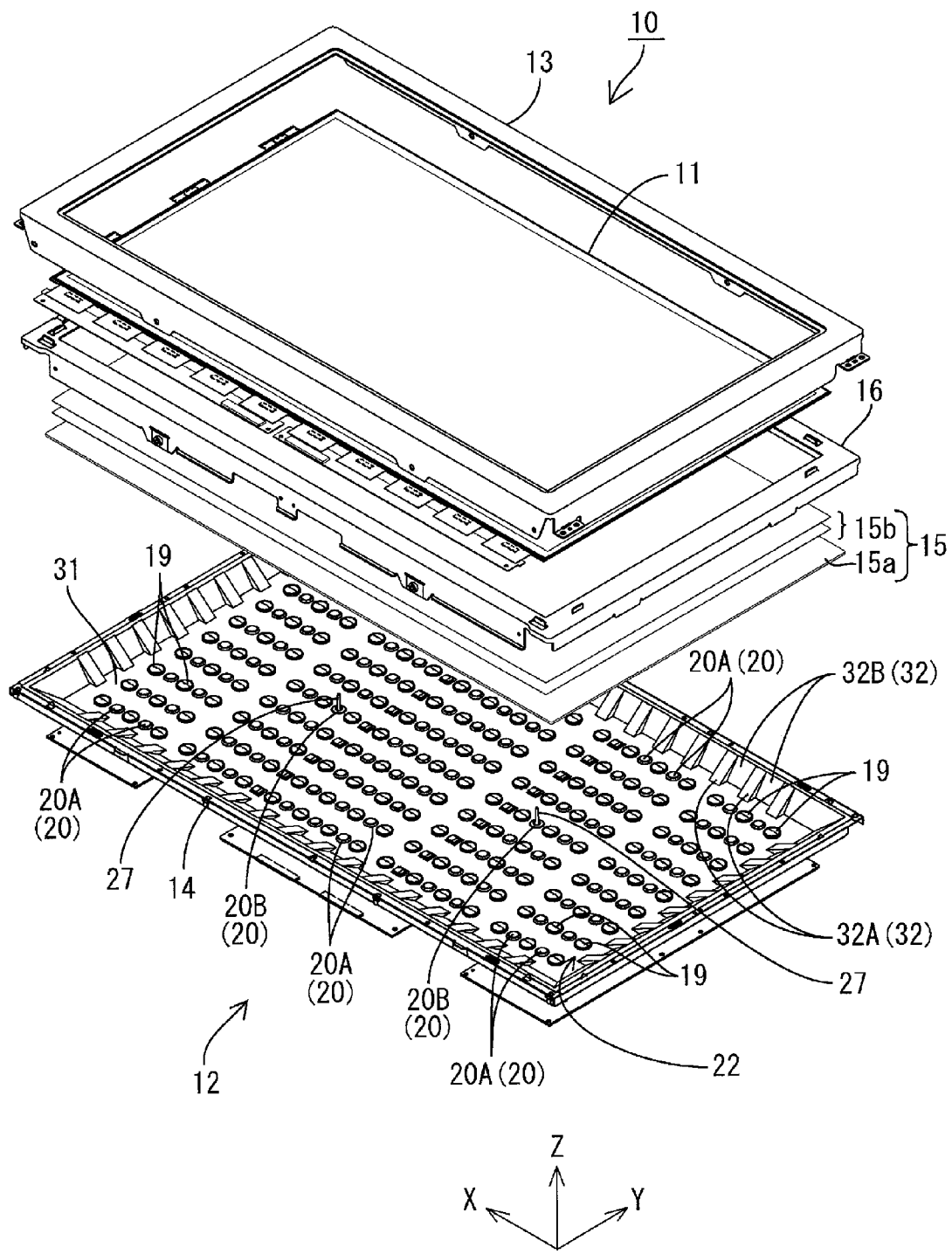
FIG. 2 is an exploded perspective view illustrating a general configuration of a liquid crystal display device included in the television receiver in FIG. 1.

As illustrated in FIG. 1, the television receiver TV of the present embodiment includes the liquid crystal display device 10, front and rear cabinets Ca, Cb which house the liquid crystal display device 10 therebetween, a power source P, a tuner T and a stand S. An entire shape of the liquid crystal display device (display device) 10 is a landscape rectangular. The liquid crystal display device 10 is housed in a vertical position. As illustrated in FIG. 2, the liquid crystal display device 10 includes a liquid crystal panel 11 as a display panel, and a backlight unit (lighting device) 12 as an external light source. The liquid crystal panel 11 and the backlight unit 12 are integrally held by a frame shaped bezel 13 and the like. In the present embodiment, a display size is 42 inches and an aspect ratio is 16:9.

Next, the liquid crystal panel 11 and the backlight unit 12 included in the liquid crystal display device 10 will be described. The liquid crystal panel (display panel) 11 is formed in a rectangular shape with a plan view and is configured such that a pair of glass substrates is bonded together with a predetermined gap therebetween and liquid crystal is sealed between the glass substrates. On one of the glass substrates, switching components (for example, TFTs) connected to source lines and gate lines which are perpendicular to each other, pixel electrodes connected to the switching components, and an alignment film and the like are provided. On the other substrate, color filters having color sections such as R (red), G (green) and B (blue) color sections arranged in a predetermined pattern, counter electrodes, and an alignment film and the like are provided. Polarizing plates 11A and 11B are attached to outer surfaces of the substrates.

The backlight unit 12 will be explained in detail. The backlight unit 12 is a direct type backlight unit in which multiple LED units U are provided directly below the back of the panel (display) face of the liquid crystal panel 11. As illustrated in FIG. 2, the backlight unit 12 includes a chassis 14, an optical sheet set 15 (a diffuser (light diffusing member) 15a, and a plurality of optical sheets 15b which is provided between the diffuser 15a and the liquid crystal panel 11), a frame 16, and a chassis reflection sheet 22. The chassis 14 has a substantially box-shape and has an opening 14b on the light exit side (on the liquid crystal panel 11 side). The optical sheet set 15 is provided so as to cover the opening 14b of the chassis 14. The frame 16 provided along an outer edge of the chassis 14 holds an outer edge of the optical sheet set 15 such that the outer edge is sandwiched between the frame 16 and the chassis 14. The chassis reflection sheet 22 covers almost entire inner surface of the chassis 14 to reflect light in the chassis 14 to the optical member 15 side.

Furthermore, an LED unit U (light source unit) including LEDs 17 (light emitting diodes) that are light sources is arranged in the chassis 14. Holding members 20 are provided to hold the LED unit U to the chassis 14. In the backlight unit 12, a light exit side of the backlight unit 12 is a side closer to the optical sheet set 15 (front-surface side) than the LED unit U. In the following, each component of the backlight unit 12 will be explained.

Figure 3:
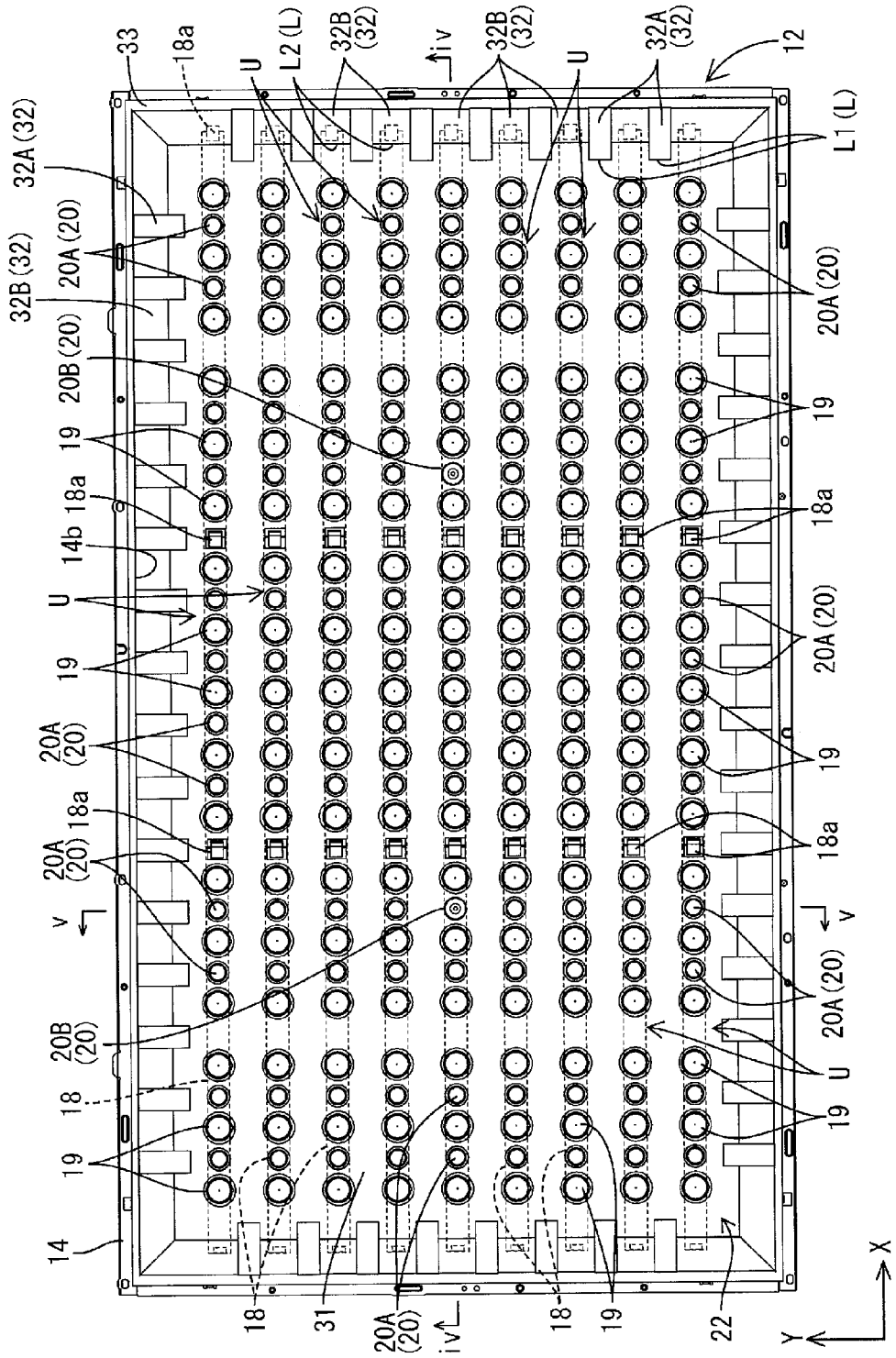
FIG. 3 is a plan view illustrating a backlight unit included in the liquid crystal display device in FIG. 2.
Figure 4:
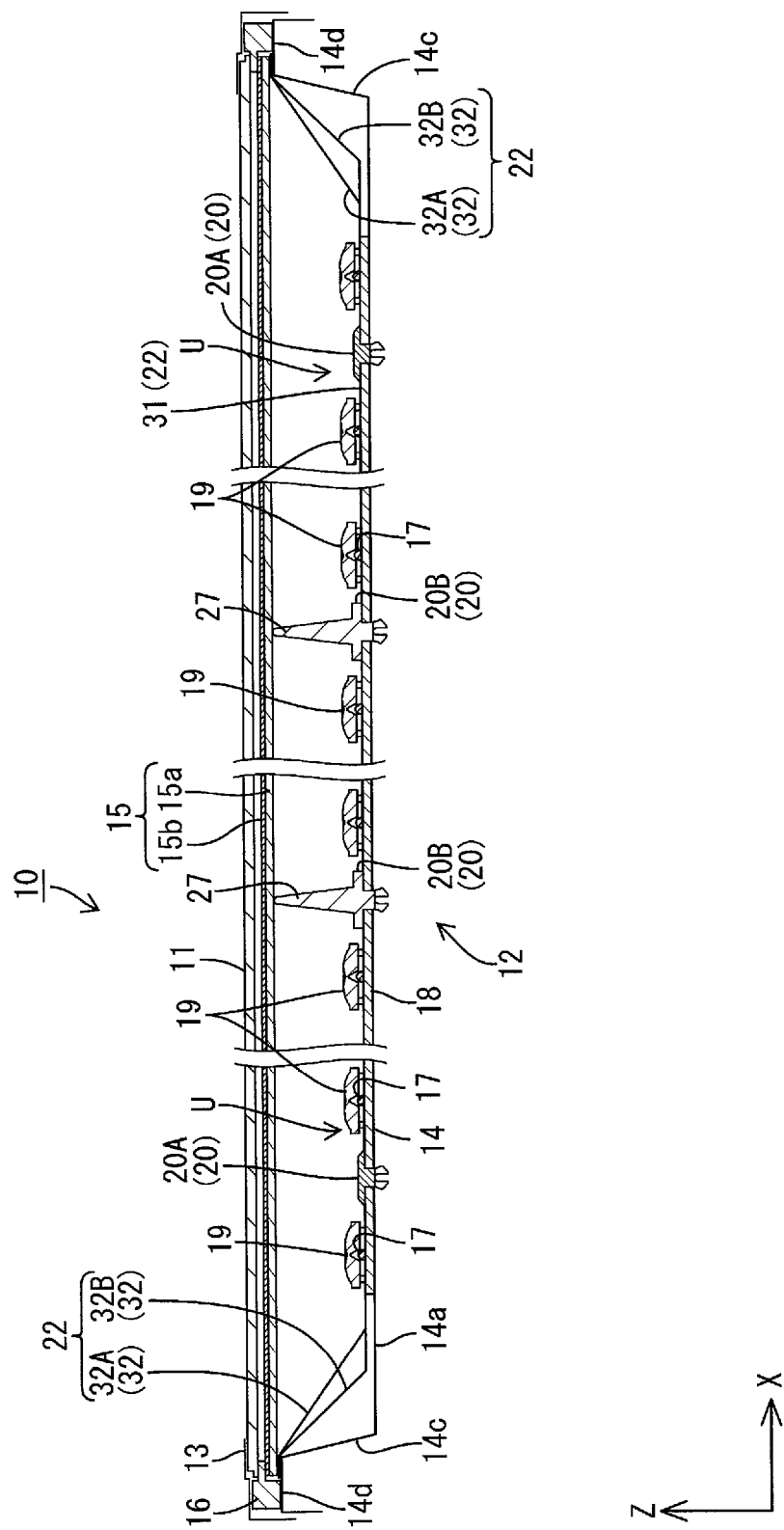
FIG. 4 is a cross-sectional view illustrating a sectional configuration of the liquid crystal display device in FIG. 2 taken along a long-side direction (a iv-iv line in FIG. 3)
Figure 5:
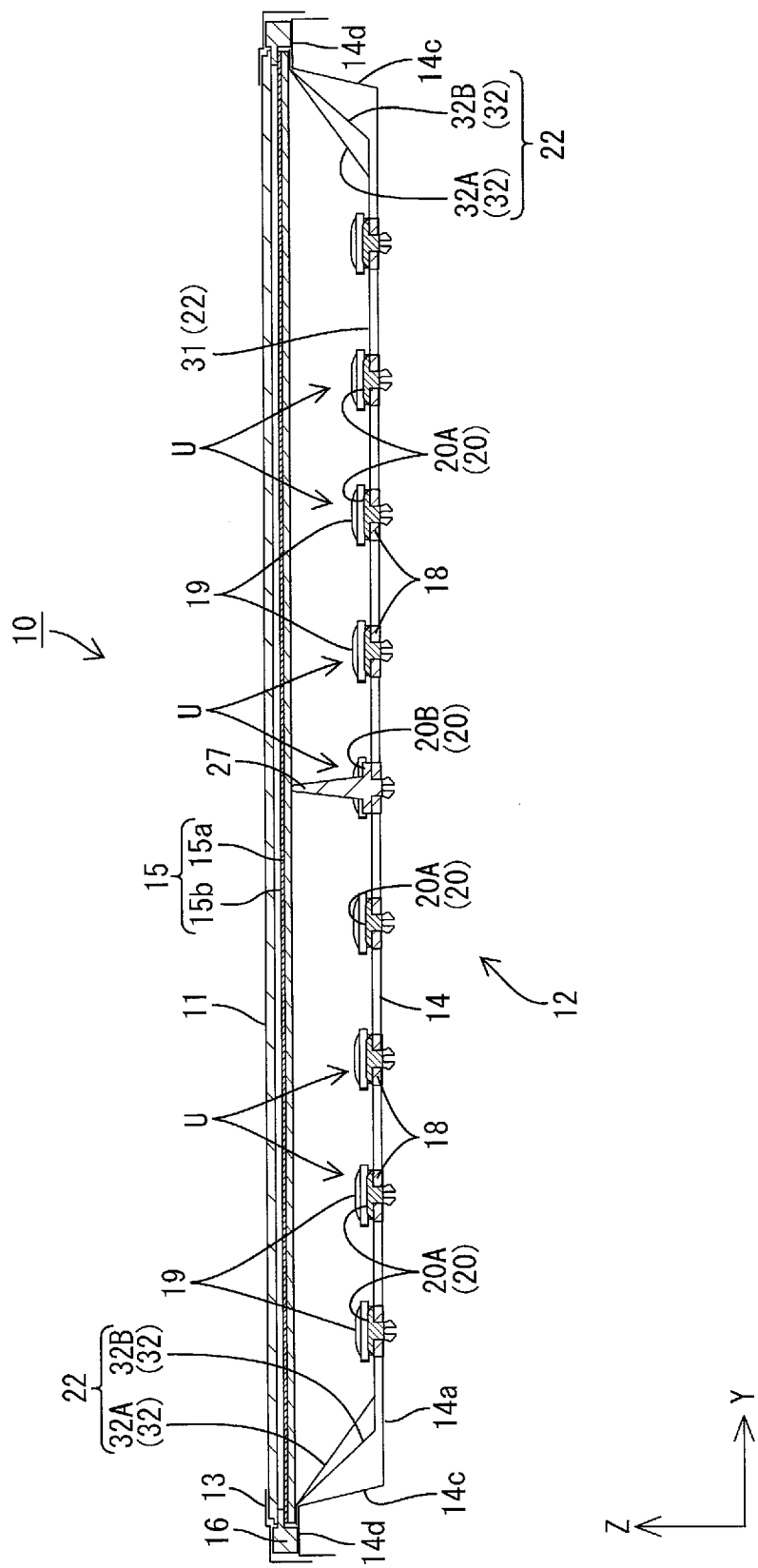
FIG. 5 is a cross-sectional view illustrating a sectional configuration of the liquid crystal display device in FIG. 2 taken along a short-side direction (a v-v line in FIG. 3)

The chassis 14 is made of metal. As illustrated in FIGS. 3 to 5, the chassis 14 includes a rectangular bottom plate 14a like the liquid crystal panel 11, side plates 14c each of which rises from an outer edge of the corresponding side of the bottom plate 14a, and a receiving plate 14d outwardly extending from a rising edge of each of the side plates 14c. An entire shape of the chassis 14 is a substantially shallow box shape (shallow plate shape) opened to the front-surface side. A long side of the chassis 14 matches an X-axis direction (a horizontal direction) and a short side thereof matches a Y-axis direction (a vertical direction). The frame 16 and an optical member 15 can be placed on the receiving plate 14d of the chassis 14 from the front-surface side. The frame 16 is fixed to each receiving plate 14d by screws.

As illustrated in FIG. 2, the optical member 15 is formed in a rectangular landscape with a plan view like the liquid crystal panel 11 and the chassis 14. As illustrated in FIGS. 4 and 5, the outer edge of the optical member 15 is placed on the receiving plate 14d so as to cover the opening 14b of the chassis 14 and provided between the liquid crystal panel 11 and the LED unit U.

The optical member 15 includes a diffuser 15a and an optical sheet 15b. The diffuser 15a is provided on the rear-surface side (the LED unit U side, a side opposite from the light exit side) and the optical sheet 15b is provided on the front-surface side (the liquid crystal panel 11 side, the light exit side). The diffuser 15a includes a base member having a thickness and made of a substantially transparent synthetic resin and light scattering particles dispersed in the base member. The diffuser 15a has a function for diffusing light that transmitting therethrough. The optical sheet 15b is formed in a sheet having a thickness smaller than the diffuser 15a. A specific optical sheet 15b may include a diffuser sheet, a lens sheet, a reflecting type polarizing sheet, and any one of them may be selected to be used.

Figure 7:
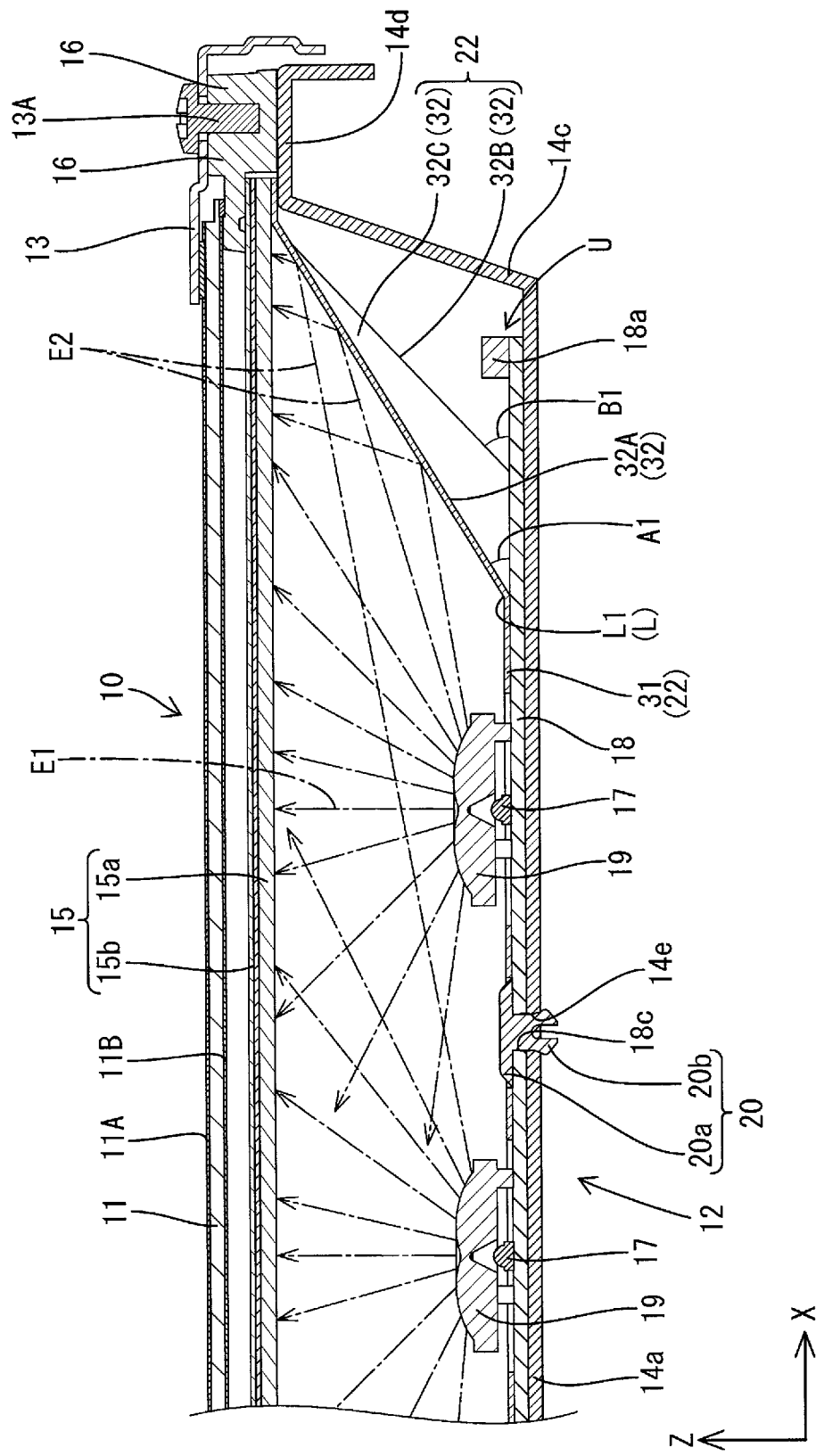
FIG. 7 is an expanded sectional view illustrating light emitted from LEDs.

As illustrated in FIG. 2, the frame 16 is formed in a frame shape along an outer peripheral part of the liquid crystal panel 11 and the optical member 15. The frame 16 and each receiving plate 14d hold the outer peripheral part of the optical member 15 therebetween (FIGS. 4 and 7). The frame 16 receives a rear surface of the outer peripheral part of the liquid crystal panel 11. The bezel 13 is fixed by screws 13A on the front-surface side of the frame 16. Accordingly, the outer peripheral part of the liquid crystal panel 11 is sandwiched between the frame 16 and the bezel 13.

Figure 6:
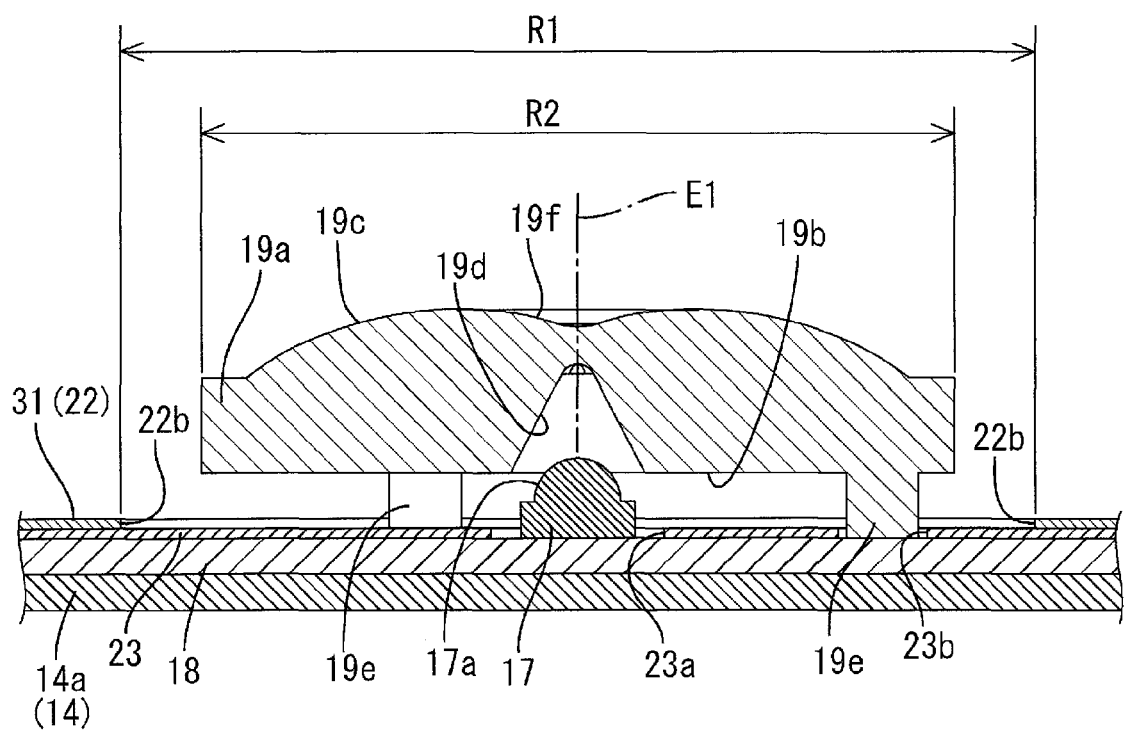
FIG. 6 is an expanded sectional view of the surroundings of an LED in FIG. 4.

Next, the LED unit U (the light source unit) will be explained in detail. As illustrated in FIG. 3, the LED unit U is formed in an elongated shape in the X-axis direction. The LED units U (in the present embodiment, nine units) are arranged in the Y-axis direction. As illustrated in FIGS. 6 and 7, the LED unit U mainly includes the LEDs 17 (light sources), an LED board (board) 18 on which the LEDs 17 are mounted. The LED unit U further includes the diffuser lenses 19 and the board reflection sheet 23. The diffuser lenses 19 are mounted on the LED board 18 corresponding to LEDs 17, respectively. Each component of the LED unit U will be explained in detail.

The LED 17 is a point light source formed in a point-like shape in a plan view. The LEDs 17 (in the present embodiment, seventeen) are arranged in a long side (the X-axis direction) of the LED board 18. As illustrated in FIG. 6, each LED 17 is configured by sealing an LED chip with a resin material onto a base board that is fixed to the LED board 18. The LED chip that is mounted on the base board has one main light emission wavelength and specifically, the LED chip that emits a single color of blue is used. On the other hand, a fluorescent material is dispersed in the resin material that seals the LED chip therein. The fluorescent material converts blue light emitted from the LED chip into white light. This enables the LED 17 to emit white light.

As illustrated in FIG. 6, the LED 17 is a top-type LED that has a light emitting surface 17a on a surface opposite from the mounting surface that is to be mounted to the LED board 18 (a surface that faces the front-surface side). A light axis E1 of light emitted from the LED 17 substantially matches the Z-axis direction (a direction perpendicular to a main plate surface of the liquid crystal panel 11 and the optical member 15). Light emitted from the LED 17 radiates three-dimensionally around the light axis E1 within a specified angle range and the directivity thereof is higher than that of cold cathode tubes. Namely, angle distributions of the LED 17 show a tendency that the emission intensity of the LED 17 is significantly high along the light axis E1 and sharply decreases as the angle to the light axis E1 increases.

As illustrated in FIG. 3, the LED board 18 is formed in a rectangular shape long in the X-axis direction with a plan view and the LED board 18 is housed in the chassis 14 with extending along the bottom plate 14a such that a long-side direction of the LED board matches the X-axis direction and a short-side direction of the LED board matches the Y-axis direction. Accordingly, the LED 17 is provided at the bottom plate 14a of the chassis 14. A connector portion 18a is provided at each end of the LED board 18 in the long-side direction.

The diffuser lens 19 is made of a synthetic resin (such as polycarbonate or acrylic) that is substantially transparent (has high light transmission) and has refraction index higher than air. As illustrated in FIG. 6, the diffuser lens 19 has a specified thickness and has a lens body 19a formed in substantially a circular shape with a plan view and the diffuser lens 19 is mounted to the LED board 18 so as to cover each LED 17 from the front-surface side individually and overlap each LED 17 in a plan view. Leg portions 19e protrude from the peripheral edge portion of a lower surface of the diffuser lens 19.

Three leg portions 19e are provided substantially at equal intervals (at angular intervals of approximately 120 degrees) along the peripheral edge portion of the diffuser lens 19 in a plan view. The leg portions 19e are fixed to a surface of the LED board 18 with an adhesive, thermosetting resin, and the like. An entrance side recess 19d is formed on a part of the lower surface of the diffuser lens 19 (the surface facing the LED 17 and the LED board 18) that overlaps the LED 17 with a plan view. The entrance side recess 19d is formed in substantially a conical shape that is recessed upward. Light from the LED 17 enters the entrance side recess 19d. The lower surface of the diffuser lens 19 is subject to a surface roughening treatment such as texturing.

A recess 19f recessed downward is formed in a center portion (the portion that overlaps the LED 17 in a plan view) of the top surface of the diffuser lens 19a (the surface facing diffuser 15a). The exit surface 19c formed by connecting two gentle circular arcs is formed on the top surface of the diffuser lens 19. Light emitted from the LED 17 is refracted between an air layer and the entrance side recess 19d and between the exit surface 19c and an air layer. This causes the light to be diffused in a planer manner and radiated at a wide angle from the exit surface 19c toward the diffuser 15a. Accordingly, light emitted from the light emitting surface 17a of the LED 17 having high directivity is diffused and exits through the diffuser lens 19. Namely, light emitted from the LED 17 lowers its directivity by transmitting through the diffuser lens 19, and therefore, even if a distance between the adjacent LEDs 17 is large, the portion between the adjacent LEDs 17 is less likely to be recognized as dark portions. Accordingly, the number of LEDs 17 that are to be arranged can be decreased. Therefore, the number of LEDs 17 that are to be arranged can be decreased.

In a portion of the light exit surface 19c that overlaps the LED 17 in a plan view, the amount of light from the LED 17 is extremely great and brightness is locally high. The light exit side recess 19f is formed on the portion of the middle in the top surface of the diffuser lens 19 and most of the rays of light emitted from the LED 17 is refracted at a wide angle to be exited therefrom or a part of the rays of light emitted from the LED 17 is reflected to the LED board 18 side. Accordingly, it is suppressed that brightness of the portion of the light exit surface 19c that overlaps the LED 17 is locally high and uneven brightness is less likely to occur.

The board reflection sheet 23 is provided so as to cover each LED board 18 independently. The board reflection sheet 23 is made of a synthetic resin, for example, and has a surface having white color that provides excellent light reflectivity. The board reflection sheet 23 extends along the LED board 18 and has a substantially same outer shape as the LED board 18 to be formed in a rectangular shape in a plan view. As illustrated in FIG. 6, the board reflection sheet 23 is arranged to cover the front-surface side of the LED board 18 that is the mounting surface where the LEDs 17 are mounted so as to cover almost its entire surface.

The board reflection sheet 23 is provided between the diffuser lens 19 and the LED board 18. Specifically, the board reflection sheet 23 is provided so as to overlap a lens fitting hole 22b (described later) formed in the chassis reflection sheet 22 in a plan view. Light that enters a space corresponding to the lens fitting hole 22b is reflected to the diffuser lens 19. This improves light use efficiency and improves brightness. In other words, sufficient brightness is obtained with decreasing the number of LEDs 17 and lowering a cost.

As illustrated in FIG. 6, an LED fitting hole 23a is formed in a portion of the board reflection sheet 23 that overlaps each LED 17 on the LED board 18 in a plan view. A diameter of each LED fitting hole 23a is greater than that of the LED 17 and smaller than that of the lens fitting hole 22b of the chassis reflection sheet 22 and the diffuser lens 19.

Leg portion fitting holes 23b are formed in the board reflection sheet 23 corresponding to the leg portions 19e. The leg portion fitting holes 23b are through holes and the leg portion 19e is fitted through each leg portion fitting hole 23b. Each leg portion fitting hole 23b is formed in substantially a circular shape with a plan view so as to fit to an outer shape of the leg portion 19e.

As illustrated in FIG. 3, a plurality of LED units U including the above components are arranged to be parallel to each other in the X-axis direction and in the Y-axis direction within the chassis 14 such that they are justified in the long-side direction and in the short-side direction. Namely, the LED units U (the LED boards 18) are arranged in rows and columns (in a matrix) within the chassis 14. The X-axis direction (the long-side direction of the chassis 14 and the LED board 18) corresponds to the row direction and the Y-axis direction (the short-side direction of the chassis 14 and the LED board 18) corresponds to the column direction. In other words, a plurality of LEDs 17 is arranged in rows and columns in the X-axis direction and the Y-axis direction (along the bottom plate 14a of the chassis 14).

Specifically, three LED units U are arranged parallel to each other in the X-axis direction within the chassis 14 and nine LED units U are arranged parallel to each other in the Y-axis direction and total of twenty seven LED units U are arranged parallel to each other in the chassis 14. In the present embodiment, two kinds of LED boards 18 having a different long-side dimension and the different number of LEDs 17 mounted thereon are used for the LED unit U. Specifically, the LED board 18 includes a six LEDs mounted-type and a five LEDs mounted-type. The six LEDs mounted-type LED board 18 has six LEDs mounted thereon and has a relatively great long-side dimension. The five LEDs mounted-type LED board 18 has five LEDs mounted thereon and has a relatively small long-side dimension. The six LEDs mounted-type LED board 18 is arranged on each end portion of the chassis 14 in the X-axis direction and the five LEDs mounted-type LED board 18 is arranged in a middle portion of the chassis 14 in the X-axis direction.

The LED boards 18 that are arranged in the X-axis direction to form a row are electrically connected to each other by connecting the adjacent connector portions 18a by fitting. The connector portions 18a located at the ends of the chassis 14 in the X-axis direction are electrically connected to an external control circuit (not illustrated). Accordingly, the LEDs 17 arranged on each of the LED boards 18 that are arranged to form a row are connected in series and turning on and off of the LEDs 17 included in one row of the LED boards 18 can be controlled collectively by one control circuit. This achieves a low cost. The LED boards 18 having a different long-side dimension and the different number of LEDs 17 mounted thereon have a same short-side dimension and same arrangement intervals of the LEDs 17.

Thus, plural kinds of the LED boards 18 having different long-side dimensions and different number of LEDs 17 mounted thereon are prepared to be used by combining the different kinds of LED boards 18 appropriately. Accordingly, following advantageous effects can be obtained. In case of manufacturing plural types of liquid crystal display devices 10 having different screen sizes, it is effective to determine whether each kind of LED boards 18 is used or not and change the number of LED board 18 for each kind according to each screen size. Compared to a case in which the LED boards having a long-side dimension same as the chassis 14 that is designed exclusively for each screen size are prepared for every screen size, the kind of the LED boards 18 that is necessary is decreased and this lowers a manufacturing cost.

In addition to the two kinds of LED boards 18 (the five LEDs mounted-type LED board 18 and the six LEDs mounted-type LED board 18), an eight LEDs mounted-type LED board 18 having eight LEDs 17 are mounted thereon may be used. The three kinds of LED boards 18 may be combined appropriately to be used for easily manufacturing liquid crystal display devices 10 having different screen sizes of 26 inches, 32 inches, 37 inches, 40 inches, 42 inches, 46 inches, 52 inches, and 65 inches with a low cost.

As illustrated in FIG. 7, the above-described LED boards 18 are fixed to the bottom plate 14a of the chassis 14 by the holding members 20. Each holding member 20 has a disk-like holding portion 20a and a stopper 20b that projects downward from the holding portion 20a. The LED board 18 has a fitting hole 18c so as to fit the stopper 20b. A mounting hole 14e is formed in the bottom plate 14a of the chassis 14 and communicates with the fitting hole 18c. A tip of the stopper 20b of the holding member 20 is wide and elastically deformed. After being fitted to the fitting hole 20c and the mounting hole 14e, the tip of the stopper 20b can be stopped by the rear surface side of the bottom plate 14a of the chassis 14. This allows the holding member 20 to fix the LED board 18 to the bottom plate 14a with holding the LED board 18 by the holding portion 20a.

As illustrated in FIG. 2, a support pin 27 extends outwardly from a surface of the holding member 20 located near the middle of the bottom plate 14a of the chassis 14. The support pin 27 tapers to the front-surface side and is formed in a conical shape with a rounded top. If the diffuser 15a bends or warps downwardly, the diffuser 15a comes in point contact with the top of the support pin 27. This allows the support pin 27 to support the diffuser 15a from a lower side. Accordingly, uneven brightness may not be caused by a bending or warping of the diffuser 15a. A reference numeral 20A is assigned to the holding members 20 without the support pins 27.

The chassis reflection sheet 22 (the reflection sheet) covers almost entire inner surface of the chassis 14. The chassis reflection sheet 22 is made of a synthetic resin, for example, and has a surface having white color that provides excellent light reflectivity. As illustrated in FIG. 3, the chassis reflection sheet 22 extends along an inner surface of the chassis 14. Almost entire area of a middle portion extending along the bottom plate 14a of the chassis 14 is a bottom portion 31.

As illustrated in FIG. 3, the bottom portion 31 is formed in an approximately rectangular shape with a plan view. The bottom portion 31 has lens fitting holes 22b that the diffuser lenses 19 included in the LED unit U are fitted therethrough. The lens fitting holes 22b are formed in a matrix so as to correspond to the arrangement of the LED unit U and the diffuser lenses 19. As illustrated in FIG. 6, each lens fitting hole 22b is formed in a circular shape with a plan view and has a diameter R1 greater than a diameter R2 of the diffuser lens 19.

Accordingly, in arranging the chassis reflection sheet 22 in the chassis 14, each diffuser lens 19 can be fitted through each lens fitting hole 22b surely even if dimension errors occur. As illustrated in FIG. 3, the chassis reflection sheet 22 covers portions between adjacent diffuser lenses 19 and outer peripheral portions of the chassis 14. Therefore, the chassis reflection sheet 22 reflects light directing toward the portions toward the optical member 15 side.

As illustrated in FIG. 3, slanted portions 32 that extend from the periphery (four sides) of the bottom portion 31 so as to slant. Each slanted portion 32 rises so as to cover each side plate 14c of the chassis 14 (FIGS. 4, 5 and 7). A placement portion 33 extends from the periphery of slanted portions 32 along the receiving plate 14d. The placement portion 33 is placed on the receiving plates 14d. In other words, slanted portions 32 connect the bottom portion 31 with the placement portion 33 in the chassis reflection sheet 22. The placement portion 33 supports the optical member 15. Accordingly, the placement portion 33 is sandwiched between the chassis 14 and the optical member 15. In the present embodiment, the slanted portions 32 extend from four sides of the outer periphery in the bottom portion 31, respectively. However, the slanted portions 32 may not extend from all four sides of the periphery of the bottom portion 31. For example, only one slanted portion 32 may extend from one of four sides of the outer periphery of the bottom portion 31.

The slanted portions 32 slant to the front-surface side (the light exit side) with respect to the bottom portion 31 such that the chassis reflection sheet 22 is partially folded. In the chassis reflection sheet 22 of the present embodiment, a boundary L between the bottom portion 31 and the slanted portions 32 is formed in a square-wave shape (a nonlinear shape) in a plan view. In other words, the boundary L is the position at which the slanted portions 32 rise (the position at which the chassis reflection sheet 22 is folded).

Specifically, the slanted portions 32 include first slanted portions 32A and second slanted portions 32B having different rising positions. As illustrated in FIG. 3, boundaries L between the first slanted portions 32A and the second slanted portions 32B are formed in the X-axis or Y-axis direction. The boundary L (L1) between the first slanted portions 32A and the bottom portion 31 is provided more inwardly (in the middle of the chassis 14) than the boundary L (L2) between the second slanted portions 32B and the bottom portion 31. As illustrated in FIG. 7, the angle of inclination A1 of the first slanted portion 32A with respect to the bottom portion 31 is smaller than the angle of inclination B1 of the second slanted portion 32B with respect to the bottom portion 31. The first slanted portion 32A extends outwardly longer than the second slanted portion 32B.

The first slanted portion 32A and the second slanted portion 32B are provided alternately in the direction in which the periphery of the bottom portion 31 extends (in the X-axis or Y-axis direction). The first slanted portions 32A are provided at equal intervals. The second slanted portions 32B are provided at equal intervals, and the second slanted portions 32B arranged around four corners of chassis 14 are not provided at equal intervals. The intervals are approximately equal to the arrangement intervals of the LED units U in the Y-axis direction. The connectors 18a in the LED units U are provided under the rear-surface side of the second slanted portions 32B (the rear side in FIG. 7). The arrangement intervals between the first slanted portions 32A and the second slanted portions 32B may be altered if necessary. Furthermore, the first slanted portion 32A and the second slanted portion 32B are connected (in other words, fill a gap between them) to form a connecting portion 32C in a triangle shape with a side view.

Next, effects in the present embodiment will be explained. Firstly, the boundaries L between the bottom portion 31 and the slanted portions 32 are formed in a square-wave shape in a plan view. The effect of this will be explained using FIGS. 7 and 9. FIG. 7 illustrates the rays of light (illustrated in dash-dotted lines) emitted from the LEDs 17 in the periphery of the bottom portion 31. As illustrated in FIGS. 3 and 7, the boundary L between the bottom portion 31 and the slanted portions 32 in the chassis reflection sheet 22 is farther from the LEDs 17 than the middle of the chassis 14. Accordingly, light emitted from the LEDs 17 is less likely to reach the boundary L.

Furthermore, as explained above, the emission intensity of each LED 17 is significantly high along the light axis E1 (in FIG. 7, an arrow E1 shows the ray of exiting light along the light axis). The emission intensity sharply decreases as the angle to the light axis E1 increases. Accordingly, the rays of light emitted from the LEDs 17 (in FIG. 7, arrows E2) are likely to reach the top surface sides of the slanted portions 32 having relatively small angles to the light axis E1. Compared to the top surface sides of the slanted portions 32, the light emitted from the LEDs 17 is less likely to reach the area around the boundary L that have the greatest angle (approximately 90 degrees) to the light axis E1.

Accordingly, light from the LEDs 17 is least likely to reach the area around the boundary L between the bottom portion 31 and the slanted portions 32 in the chassis reflection sheet 22. The amount of light reflected by the chassis reflection sheet 22 is small on the boundary L. The boundary L tends to be darker than the surroundings thereof, and therefore uneven brightness is likely to occur. Here, as illustrated in the comparison example of FIG. 9, if the boundary L3 between the bottom portion 31 and the slanted portions 32 is formed in a linear shape, the dark portion D2 corresponds to the boundary L3 is to be formed in a linear shape. If the dark portion D2 is formed in a linear shape, a boundary between the dark portions D2 and the surroundings thereof is clear. Uneven brightness is more likely to be recognized.

Figure 8:
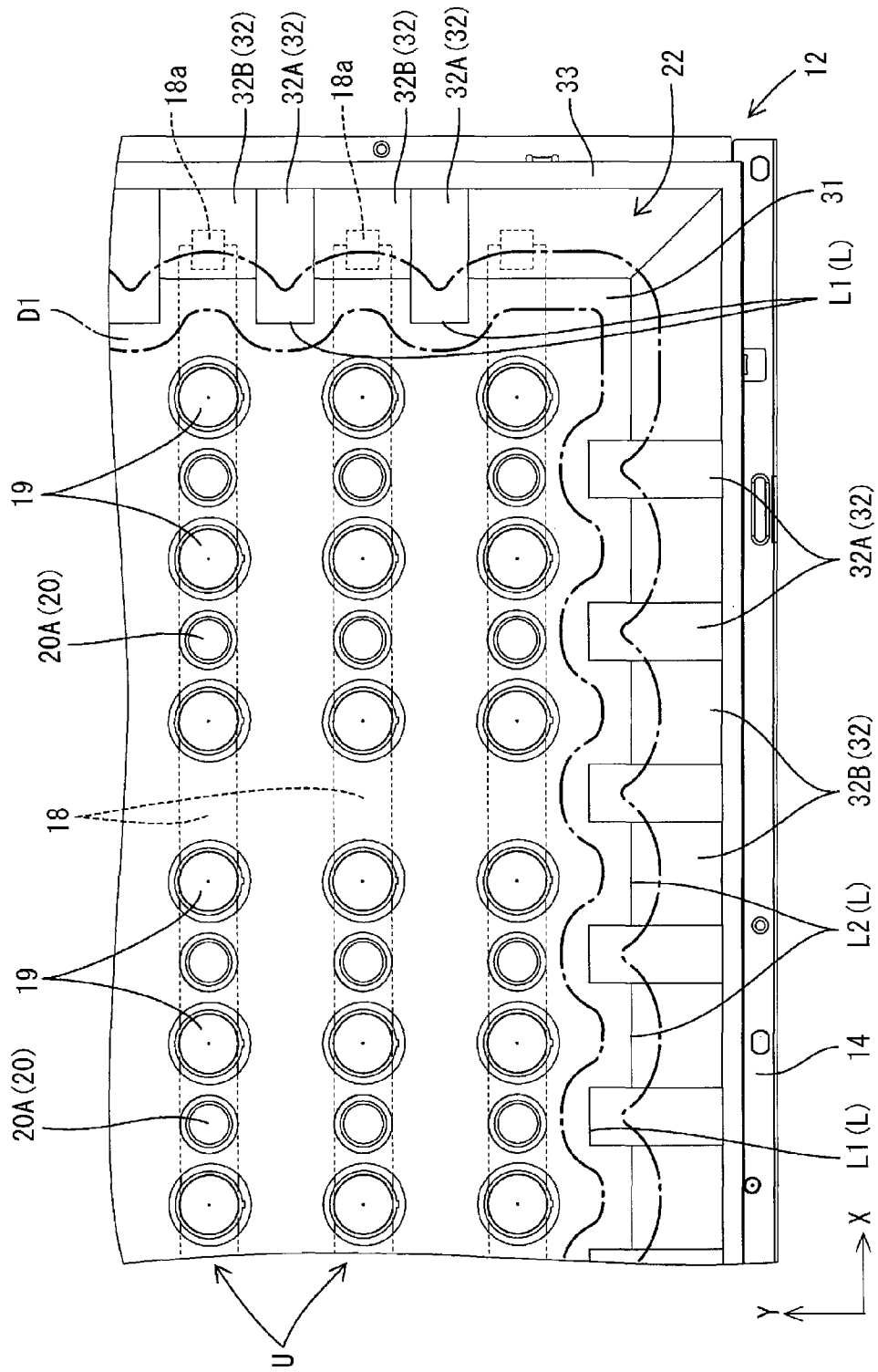
FIG. 8 is an enlarged view in the vicinity of a peripheral portion of the chassis reflection sheet in FIG. 3.
Figure 9:
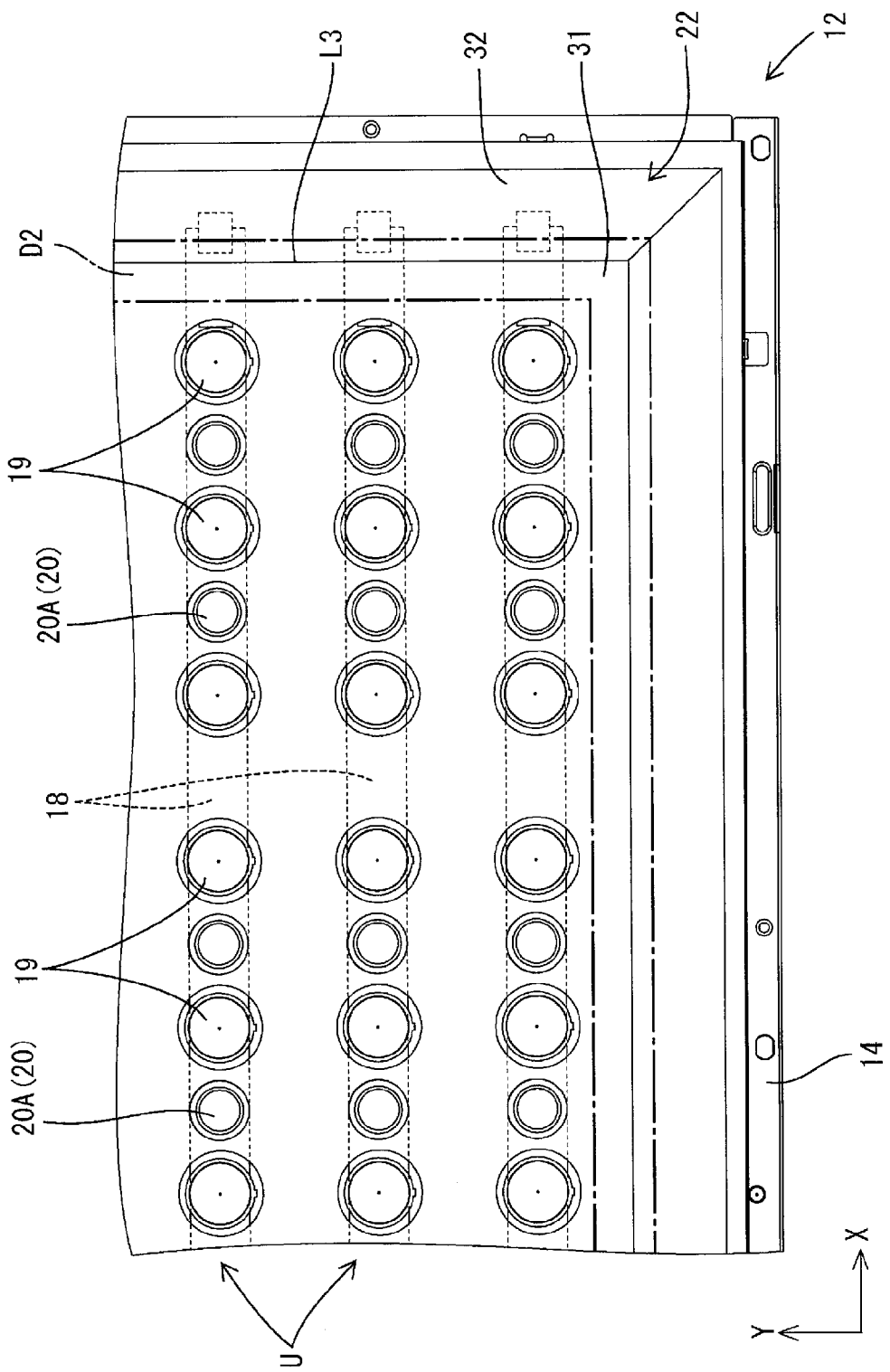
FIG. 9 illustrates an comparison example.

In the present embodiment, the boundary L between the bottom portion 31 and the slanted portions 32 is formed in a square-wave shape in a plan view. With this configuration, the dark portion D1 to be formed on the boundary L (the portion illustrated in dash-dotted lines in FIG. 8) will be in a square-wave shape in a plan view as illustrated in FIG. 8. Accordingly, if the dark portion D1 is formed in a square-wave shape, the boundary between the dark portion and the surroundings thereof is less clear than a linear-shaped dark portion D1. Therefore, uneven brightness is less likely to be recognized.

The square-wave-shaped boundary L is more easily formed than other nonlinear shapes (such as curves in a sinusoidal-wave shape). If a curved boundary L is formed, surfaces of slanted portions 32 are required to be formed in a curved shape. This may cause uneven brightness. However, the boundary L of the present embodiment is formed in a square-wave shape and the slanted portions 32 can be formed with flat surfaces. Therefore, uneven brightness may not be caused by the reasons explained above.

The slanted portion 32 is formed by partially folding the chassis reflection sheet 22. With such a configuration, the bottom portion 31 and the slanted portion 32 are not required to be formed from different members, and therefore the number of parts decreases. Thus, the chassis reflection sheet 22 may be easily handled (installed, kept and the like).

The LED 17 is used as a light source. This achieves low power consumption.

The diffuser lens 19 is provided so as to cover the LED 17 and diffuses light from the LED 17. With such a configuration, light from the LED 17 is diffused through the diffuser lens 19. This makes intervals at which LEDs are arranged longer (namely, the number of LEDs decreases), and this makes the brightness uniform.

<Second Embodiment>

A second embodiment of the present invention will be explained with reference to FIG. 10. The same constituent parts and constituent elements as those of the first embodiment are indicated by the same symbols, and will not be explained. The second embodiment is different from the first embodiment in the shape of a boundary L3 between a bottom portion 131 and slanted portions 132 of a chassis reflection sheet 122 in a backlight unit 112 of the present embodiment. The boundary L3 includes linear portions LA3 and peak portions LB3. Each linear portion LA3 is formed in a straight-line shape. Each peak portion LB3 is formed by partially projecting the slanted portion 132 toward inside the chassis 14. Each linear portion LA3 and each peak portion LB3 are arranged alternately, and accordingly, the boundary L3 is formed in a nonlinear shape. The operations and effects of the present embodiment are as same as the first embodiment, and will not be explained.

In the present embodiment, the bottom portion 131 and the slanted portions 132 are made from different members. This makes it possible to form the chassis reflection sheet 122 having nonlinear boundaries easily, compared to a case of forming the bottom portion 131 and the slanted portions 132 from a single member (for example, a case where the chassis reflection sheet 122 is folded to form the bottom portion 131 and the slanted portions 132).

<Other Embodiments>

The present invention is not limited to the above embodiments described in the above description and the drawings. The following embodiments are also included in the technical scope of the present invention, for example.

(1) In the above embodiments, the boundary (L or L3) between the bottom portion and the slanted portions in the chassis reflection sheet is formed in a square-wave shape or nonlinear shape including the peak portions LB3. However, the boundary may be formed in any nonlinear shapes.

(2) In the above embodiments, the LED 17 is used as a light source. A light source other than the LED may be used. For example, a cathode tube may be used as the light source.

(3) In the above embodiments, a long side of the LED board 18 is provided to meet the X-axis direction. However, the long side of the LED board 18 may be provided to meet the Y-axis direction.

(4) In the above embodiments, TFTs are used as switching components of the liquid crystal display device. However, the technology described above can be applied to liquid crystal display devices including switching components other than TFTs (e.g., thin film diode (TFD)). Moreover, the technology can be applied to not only color liquid crystal display devices but also black-and-white liquid crystal display devices.

(5) In the above embodiments, the liquid crystal display device including the liquid crystal panel as a display panel. The technology can be applied to display devices including other types of display components.

(6) In the above embodiments, the television receiver including the tuner is used. However, the technology can be applied to a display device without a tuner.

Explanation of Symbols

10: liquid crystal display device (display device), 11: liquid crystal panel (display device panel), 12, 112: backlight unit (lighting device), 14: chassis, 14a: bottom plate, 17: LED (light emitting diode, light source), 19: diffuser lens, 22, 122: chassis reflection sheet (reflection sheet), 31, 131: bottom portion, 32, 132: slanted portion, L, L3: boundary, TV: television receiver

The invention claimed is:

1. A lighting device comprising:
   at least one light source;
   a chassis housing the at least one light source therein; and
   a reflection sheet provided on an inner surface of the chassis and configured to reflect light from the at least one light source, wherein:
   the at least one light source is provided at a bottom plate of the chassis;
   the reflection sheet includes a bottom portion that extends along the bottom plate and slanted portions that extend from a periphery of the bottom portion;
   the slanted portions slant toward a direction in which light from the at least one light sources is emitted with respect to the bottom portion; and
   a boundary between the bottom portion and the slanted portions is formed in a nonlinear shape in a plan view.

2. The lighting device according to claim 1, wherein the boundary between the bottom portion and the slanted portions is formed in a square wave shape in the plan view.

3. The lighting device according to claim 1, wherein the slanted portions are formed by partially folding the reflection sheet.

4. The lighting device according to claim 1, wherein the bottom portion and the slanted portions are made from different members.

5. The lighting device according to claim 1, wherein:
   the bottom portion is formed in an approximately rectangular shape in the plan view; and
   the slanted portions extend from four sides of the bottom portion, respectively.

6. The lighting device according to any claim 1, wherein the at least one light source is a light emitting diode.

7. The lighting device according to claim 1, further comprising a diffuser lens arranged so as to cover the at least one light source and configured to diffuse light from the at least one light source.

8. The lighting device according to claim 1, wherein the at least one light source includes a plurality of light sources arranged in rows and columns in the direction along the bottom plate of the chassis.

9. A display device comprising:
   the lighting device according to claim 1; and
   a display panel configured to provide display using light from the lighting device.

10. The display device according to claim 9, wherein the display panel is a liquid crystal panel using liquid crystals.

11. A television receiver comprising the display device according to claim 9.

* * * * *